May 19, 1959 R. W. CANNON 2,887,090
METHOD FOR TREATING HATCHING EGGS
Filed Sept. 4, 1956
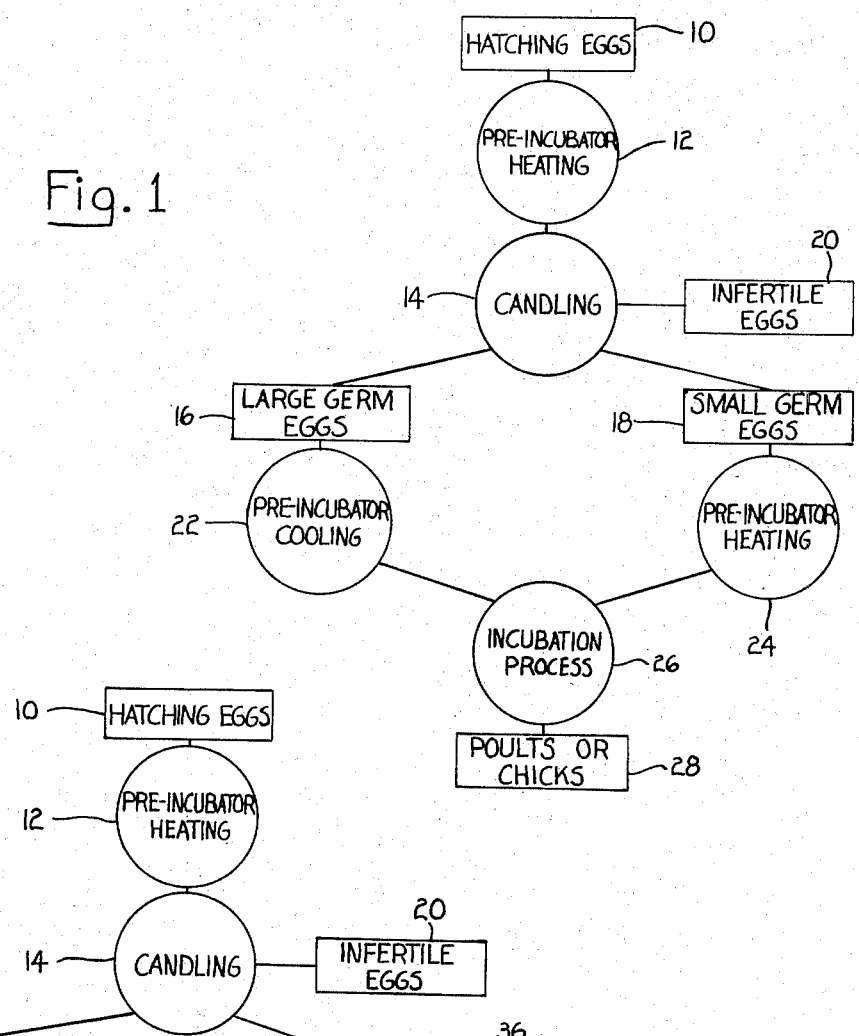
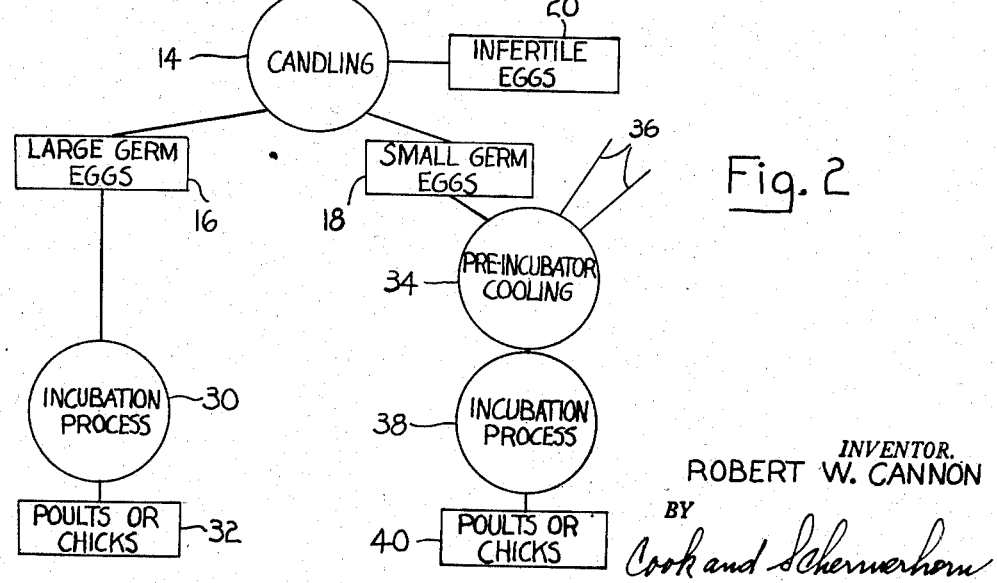
INVENTOR.
ROBERT W. CANNON
BY
Cook and Schermerhorn
ATTORNEYS ment employing means for controlling the temperature, humidity, and air circulation around the eggs. To utilize the equipment in the most efficient way possible, it is necessary that all eggs inserted therein are fertile and, in addition, it is necessary that all the eggs hatch at the same time so that one batch of eggs can be removed and the next batch immediately inserted. If the actual hatching of the eggs in a batch is prolonged over several days, it is apparent that there is a serious cutting down of the efficient usage of the incubator.

2,887,090

METHOD FOR TREATING HATCHING EGGS

Robert William Cannon, Salem, Oreg., assignor to R. W. Cannon & Co., Inc., Salem, Oreg., a corporation of Oregon Application September 4, 1956, Serial No. 607,722

10 Claims. (Cl. 119—1)

This invention relates to an improved method for the treatment of eggs for hatching.

Certain problems have long existed in the hatching of eggs in large quantities. In addition to the problem of infertility, it has long been observed that all the eggs in an incubator do not hatch at the same time. This is of great inconvenience where the newly hatched chicks or poults are to be shipped before feeding because the first hatched cannot be held until the last hatched have emerged. Rather than make several shipments and keep the incubators operating until all are hatched, hatchers prefer to incubate an excess quantity of eggs and then empty the incubators and discard all eggs which are unhatched when the first hatched cannot be held longer and must be shipped.

Also, there is the problem of weak chicks and weak poults which has heretofore been similarly dealt with by incubating a sufficient excess quantity of eggs to provide the desired number of strong chicks or poults for delivery in a single shipment. This prior practice has been wasteful and inefficient but has become generally accepted largely because the reasons for late hatching and the causes of weak chicks and poults were not known. The present invention deals with all of the foregoing problems which are more acute in the case of turkeys because of the higher rate of infertility, the longer incubation time and the larger incubation and shipping facilities required, in comparison with the case of chickens.

As is well known, the germ of a fertile chicken or turkey egg floats in the yolk and the yolk floats in the albumen. The specific gravity of the yolk is slightly less than the albumen, and, if the egg lies in the same position for a time, the yolk will move upwardly against the upper side of the shell. The germ in the yolk tends to rise against the inner membrane of the shell, and, if the egg remains in one position too long, the germ will stick to the membrane and die. For this reason eggs are turned at frequent intervals during incubation.

It is also well known that in batches of eggs produced for hatching purposes, approximately 20 to 25% of turkey eggs are infertile. Of the 75 to 80% fertile eggs, applicant has found that approximately 60% to 80% have what have been referred to as "strong" or normal germs and the remainder have what have been referred to as "weak" germs. Applicant believes that the only difference between the strong germ eggs and the weak germ eggs is that the former are further developed and will, therefore, hatch in a fewer number of days. The strong germs are of a larger size than the weak germs. The difference in development is believed due to difference in the ages of the eggs, difference in environmental temperature, and difference in germ development in the egg before it is laid. Therefore, the strong germs will hereinafter be referred to as large germs and the weak germs will be referred to as small germs.

In the commercial hatching of eggs, it is desirable to utilize the incubator equipment as efficiently as possible, partly because of the expense of the operation, such equipment employing means for controlling the temperature, humidity, and air circulation around the eggs. To utilize the equipment in the most efficient way possible, it is necessary that all eggs inserted therein are fertile and, in addition, it is necessary that all the eggs hatch at the same time so that one batch of eggs can be removed and the next batch immediately inserted. If the actual hatching of the eggs in a batch is prolonged over several days, it is apparent that there is a serious cutting down of the efficient usage of the incubator.

It is believed that a primary cause of weak chicks or weak poults is that the incubator conditions and treatment in regard to temperature, humidity, turning, etc., which are adjusted for the expected hatching time of the "strong" germ eggs are not optimum for the slower "weak" germ eggs which are in an earlier stage of development. As a corollary it is believed, and has been found, that "weak" germ eggs will produce strong chicks or poults if given special treatment, and need not be sacrificed either before or after hatching.

It is well known that after a certain incubation time the germ is visible to the human eye when a strong light beam is passed through the egg. If no germ is seen, the egg is infertile and can be set aside to make room for a fertile egg. By such a process, it can be assured that all the eggs in a batch will hatch, but no rapid, commercially practicable candling process has heretofore been devised for reliably detecting infertile eggs at an early stage while they are still usable for human consumption.

Also, no means have heretofore been known to accomplish substantially simultaneous hatching of all the eggs in a batch. The failure to accomplish such simultaneous hatching is found to be caused by the intermingling of large germ eggs with small germ eggs in that, as explained above, the large germ eggs hatch in less time than small germ eggs. In addition to cutting down the efficiency of the incubator, such intermingling of large and small germ eggs also produces the other disadvantage mentioned above that, when the latter eggs do hatch, the chicks or poults therefrom are weak and have little or no commercial value, it being customary in present day hatcheries to destroy the weak poults.

A principal object of the invention is to provide an improved method for treating hatching eggs to increase incubator efficiency and over-all efficiency in the production of poults or chicks.

Another object is to accomplish the substantially simultaneous hatching of all the eggs in the incubator.

Another object is to substantially eliminate loss from weak chicks or poults.

Another object is to provide special treatment for potential weak chicks or poults so that all chicks or poults hatched will be strong.

Another object is to classify hatching eggs according to germ development whereby all the eggs in an incubator will have the same germ development and will be subjected to incubator conditions throughout the incubator period appropriate to the progress of the germ development.

Another object is to eliminate any necessity for opening an incubator from the time it is loaded until the eggs are hatched.

The invention will be better understood and additional objects and advantages will become apparent from the following description taken in connection with the accompanying drawings which illustrate diagrammatically preferred manners of carrying out the method of the invention. It is to be understood, however, that the method of the invention may be varied to considerable extent without departing from the spirit of the invention which is defined in the appended claims.

In the drawings:

Figure 1 is a diagrammatic illustration of a method for carrying out the principles of the present invention; and Figure 2 is a diagrammatic illustration of a modified method.

In accordance with the present invention, it has been found that the germ development in a typical batch of eggs received by a hatchery is not uniform and that large germ eggs can be distinguished from small germ and infertile eggs after a short pre-heating step. In one manner of carrying out the present method, the large and small germ eggs are then processed differently to a common stage of germinal development and placed together in an incubator, whereby all the eggs in the batch hatch at substantially the same time. In another form of the method, the large germ eggs, after the pre-heating step, are placed in an incubator for hatching and the small germ eggs combined with like eggs from other batches and placed in a separate incubator for hatching.

Referring to Figure 1, a batch of hatching eggs, designated by the block 10, are subjected to a pre-incubator heating step, designated by the numeral 12. In this pre-incubator step the eggs are preferably placed in trays in a rack which may be tilted on a horizontal axis, the eggs preferably being oriented in the rack with their longitudinal axes horizontal and parallel to the axis of the rack. The rack is tilted from side to side every few hours so that the germ does not adhere to the shell membrane. This step of the method is carried out in a temperature-controlled room maintained at the approximate temperature of an incubator where the air is humidified and circulated for good heat exchange between the air and the eggs. More specifically, this step of the method is carried out at approximately 99½° F. and 55% relative humidity in the case of turkey eggs.

The minimum length of time which the eggs are subjected to the pre-incubator heating step 12 depends upon the species of fowl. Chicken eggs may be subjected to as little as sixteen hours of this step, and turkey eggs are subjected to approximately twenty-four hours of said step. A twenty-four hour period of treatment is usually the most convenient regardless of the minimum requirement. In either case, however, the temperature and relative humidity values are carefully controlled the same as in an incubator.

The next step of the method, designated by the numeral 14, comprises candling the eggs. In this step strong light rays are passed through the eggs from end to end, the light preferably entering from the small end of the egg. The pre-incubator heating step causes the germs of the eggs to be developed sufficiently so that they are discernible by the human eye when in the most favorable position for viewing.

In the candling step, the eggs are separated into three groups comprising large germ eggs 16, small germ eggs 18, and infertile eggs 20. The large germ eggs are then subjected to a pre-incubator cooling step 22. In this step the eggs are placed in a cold room where the temperature is maintained at approximately 45° F., and it is found that at this temperature the development of the egg germ is interrupted but the germ is not damaged in any way.

The small germ eggs are subjected to a pre-incubator heating step 24 in a warm room at the ordinary incubator temperature and are turned periodically. The length of time that these eggs are subjected to the heating step 24 depends upon the stage of development of the germ therein. In any event, the small germ eggs are subjected to this heating step for a time sufficient to advance their germs to a stage of development identical with the large germ eggs 16. It has been found that in the usual run of eggs, in order to bring the small germ eggs into the same stage of development as the large germ eggs, they must be subjected to a pre-incubator heating step of twelve to twenty-four hours.

After the small germ eggs have been subjected to the step 24, which may be in the same room in which the eggs were placed for step 12, a time sufficient to advance their germs to a stage of development the same as the large germ eggs, both groups of eggs are placed in an incubator to complete and incubation process 26 at usual temperatures and humidities and turning schedules. When the incubation period is completed, the eggs hatch into poults or chicks as designated by the block 28, and, as described hereinabove, the hatching event for all the eggs will occur at approximately the same time, whereby all the poults or chicks may be delivered in a single shipment.

Altermnatively, Figure 2, after the candling step, the large germ eggs 16 may be subjected to an incubation process 30 for hatching into poults and chicks, designated by the numeral 32, and the small germ eggs 18 from this candling step, if a full batch is not available, may be subjected to a pre-incubator cooling step 34 with like eggs from other batches in a cool room to accumulate a full setting. Character lines 36 leading into the step 34 designate generally groups of small germ eggs which have been candled in other batches. As in the step designated by the reference numeral 22 of Figure 1, the cool room is maintained at approximately 45° F., which temperature interrupts the development of the germ without harm. When a full setting of small germ eggs is obtained, they are subjected to an incubation process 38 in an incubator for hatching into poults or chicks, designated by the numeral 40. A slightly longer time will be required in the incubator than is necessary in step 30 with the large germ eggs but all the eggs will hatch at the same time.

It may happen that at a particular time there are not enough large germ eggs for a desired incubator setting, that an incubator is not immediately available, that such eggs are not required at the moment to fill an order for poults or chicks, or that for some other reason the operator is not ready to place the large germ eggs 16 in Figure 2 in an incubator. In such cases the eggs 16 may be placed temporarily in cool storage as at 22 in Figure 1 to be combined later either with other large germ eggs 16 or with small germ eggs that have been developed by a pre-incubator heating step 24.

It will be appreciated that either the large germ or small germ eggs may be placed in cool storage as at steps 22 or 34 at any stage perior to incubation steps 26, 30 or 38 without injury to the eggs. In all cases the object is always to avoid mixing large and small germ eggs in the incubator as is done in a conventional practice. The sequence of process steps herein disclosed may thus be varied to suit the time factor, the egg supply, the demand for poults and chicks and the availability of labor and equipment. The present process, by reason of its flexibility, increases the over-all efficiency of production by improving the coordination of activities in filling orders as well as by increasing the percentage of strong poults and chicks in each hatch.

In carrying out the invention, an efficient method is thereby provided for the treatment of eggs for hatching. This method provides maximum efficiency in the output of the incubator in that all the eggs in the incubator hatch at approximately the same time whereby the poults or chicks can be removed therefrom and another batch of eggs immediately inserted. This method conserves on the expensive energy consumption of incubators and, preferably, to accomplish this purpose, the pre-incubation heating steps 12 and 24 are accomplished in a warm room which may be steam heated at low cost in relation to the cost of operation of the incubators which are electrically heated. As all the eggs are in the same stage of germ development, the changes in temperature, humidity and the turning schedule as the incubation period progresses are optimum for all the eggs at all times whereby fewer weak poults or chicks are produced. When the incubator is opened to remove the first hatched, the remaining eggs are about to hatch and will not be injured by the drop in temperature as are eggs in conventional procedure which may be several hours short of hatching. After the incubator is initially loaded it need not be opened until it is necessary to start removing the poults or chicks. In the late stages of incubation the eggs will not tolerate cooling as they will in the initial stages. Avoidance of opening the incubator for candling and the removal of early hatchers also conserves the expensive electrical heating energy which is thus not required to restore such heat losses.

Time is also important in the hatching season. The present method reduces the incubator time several days, thereby increasing the number of hatches obtained from an incubator each season.

Having now described my invention and in what manner the same may be used, what I claim as new and desire to protect by Letters Patent is:

1. In a hatching process for eggs, the steps of heating the eggs to develop all germs that may be present sufficiently to be discernible by the human eye, separating the fertile eggs from the infertile eggs, separating the fertile eggs into two groups comprising those having large germinal development and those having small germinal development, and then subjecting one of said groups to a cooling step for interrupting the development of the germ, all before the eggs are placed in an incubator.

2. In a hatching process for eggs, the steps of heating the eggs to develop all germs present sufficiently to be discernible by the human eye, separating the fertile eggs from the infertile eggs, separating the fertile eggs into two groups comprising those having large germinal development and those having small germinal development, subjecting one of said groups of eggs to a cooling step, and subjecting the other group to incubating temperature.

3. In a hatching process for eggs, the steps of heating said eggs to develop their germs, if present, sufficiently to be discernible by the human eye, candling the eggs, separating the fertile eggs from the infertile eggs, separating the fertile eggs into two groups comprising those having large germinal development and those having small germinal development, subjecting the eggs having small germinal development to incubating temperature for a time sufficient to develop the germ to a stage of advancement equal to that of the eggs having large germinal development, and thereafter subjecting the two groups of eggs together to an incubating process.

4. In a hatching process for eggs, the steps of heating said eggs to develop their germs, if present, sufficiently to be discernible by the human eye, candling the eggs, separating the fertile eggs from the infertile eggs, separating the fertile eggs into two groups comprising those having large germinal development and those having small germinal development, subjecting the eggs having large germinal development to a cooling step for interrupting the development of the germ, subjecting the eggs having a small germinal development to a heating step for a time sufficient to develop the germ equal to the said large germinal development, and thereafter subjecting the two groups of eggs together to an incubating process.

5. In a hatching process for eggs, the steps of heating said eggs to develop their germs sufficiently for candling, candling the eggs, separating said eggs into three groups comprising infertile eggs, large germ eggs and small germ eggs, incubating said large germ eggs, storing said small germ eggs at a temperature sufficiently cool to arrest germ development, adding to said cool storage other small germ eggs until a predetermined batch is accumulated, and then incubating said batch.

6. In a hatching process for eggs, the steps of heating said eggs to develop their germs sufficiently for candling, candling the eggs, separating said eggs into three groups comprising infertile eggs, large germ eggs and small germ eggs, subjecting the large germ eggs to a temperature sufficiently cool to arrest germ development, heating the small germ eggs to advance germ development equal to that of the large germ eggs, and then combining and incubating said last two groups.

7. In a hatching process for eggs, the steps of subjecting eggs to incubating temperature in a heated room for a time sufficient to develop their germs for candling, candling the eggs, separating the eggs into three groups comprising infertile eggs, large germ eggs and small germ eggs, placing one of said last two groups in an incubator for hatching, and placing the other of the last two groups in a cold room at a temperature sufficiently cool to arrest germ development.

8. In a hatching process for eggs, the steps of heating said eggs to develop their germs sufficiently for candling, candling the eggs, separating said eggs into three groups comprising infertile eggs, large germ eggs and small germ eggs, storing one of said groups at a temperature sufficiently cool to arrest germ development, subsequently combining said stored group with another group of eggs having a corresponding germ development, and then incubating said combined groups.

9. The process as defined in claim 8 in which said stored group comprises said large germ eggs.

10. The process as defined in claim 8 in which said stored group comprises said small germ eggs.

References Cited in the file of this patent

UNITED STATES PATENTS

| | | |
|---|---|---|
| 745,458 | Perkins | Dec. 1, 1903 |
| 1,297,175 | Jeans | Mar. 11, 1919 |
| 2,118,794 | King | May 24, 1938 |

OTHER REFERENCES

"Early Identification of Fertility in Hens' Eggs," by M. W. Olsen and C. W. Knox, reprint from "Poultry Science"; vol. XVII, No. 6, November 1938. Pages 472–477, 119–1.

"Variability Among Turkey Embryos at Twenty-Four Hours of Incubation With Respect to Hatchability," by M. W. Olsen and S. J. Marsden, reprint from "Poultry Science"; vol. XXIX, No. 3, May 1950. Pages 414–418, 119–1.